United States Patent [19]
Fisher

[11] 3,724,773
[45] Apr. 3, 1973

[54] SEAT BELT RETRACTOR
[76] Inventor: Robert C. Fisher, 580 East Long Lake Road, Bloomfield Hills, Mich. 48013
[22] Filed: May 6, 1971
[21] Appl. No.: 140,675

[52] U.S. Cl...............................................242/107.4
[51] Int. Cl. ...............................................A62b 35/00
[58] Field of Search..........242/107 SB, 107.4, 107.5, 107.6,
242/107.7; 297/388; 280/150 SB

[56] References Cited
UNITED STATES PATENTS 3,193,327  7/1965  Roe..................................242/107 SB
3,635,419  1/1972  Pringle............................242/107.4
3,294,399  12/1966  Fontaine..........................242/107.4
3,598,336  8/1971  Frost................................242/107.4

*Primary Examiner*—Werner H. Schroeder
*Attorney*—Harness, Dickey & Pierce

[57] ABSTRACT

The disclosure relates to a seat belt retractor comprising a toothed spool having a seat belt wound thereon and a pawl member adapted to engage a tooth on the spool for limiting the rotation thereof after a predetermined time interval after the protraction of the belt.

5 Claims, 3 Drawing Figures

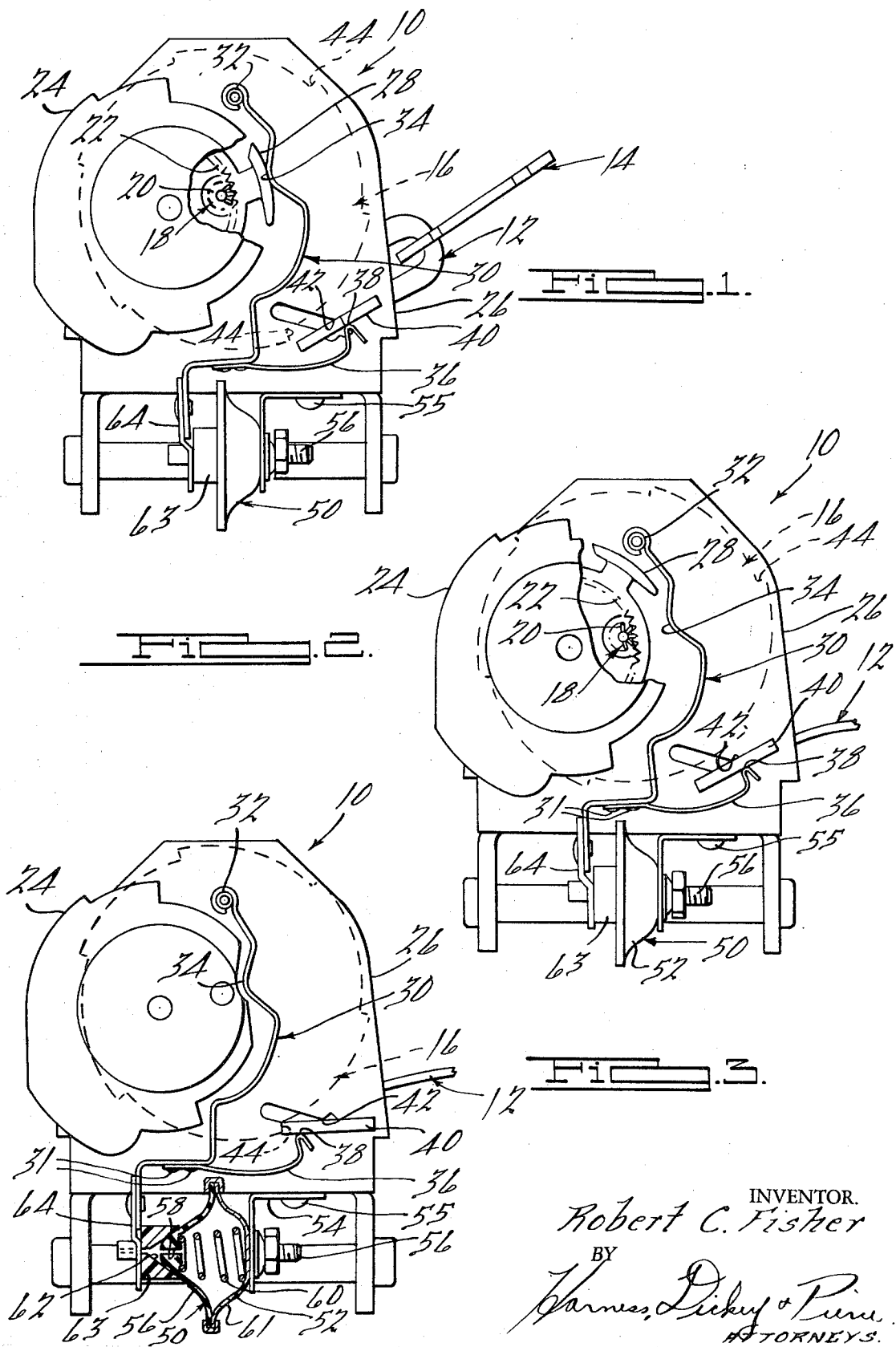

SEAT BELT RETRACTOR

BACKGROUND OF THE INVENTION

Seat belt retractors heretofore known and used have utilized time delay lockin mechanisms for automatically locking the belt after protraction thereof, thereby eliminating the requirement for belt length adjustment mechanism on the associated belt buckle. An example of such a retractor is found in U.S. Pat. No. 3,384,415.

SUMMARY OF THE INVENTION

This invention relates to an improved time delay mechanism for reengaging the pawl or latch member of a seat belt retractor when the belt is in a desired protracted position. A pivoted control arm has a cam follower section which is engaged by a cam which advances the arm counterclockwise. The cam is advanced to engage the cam follower when the seat belt is protracted, that is pulled outwardly from the supported spool which is rotated thereby. A force applying actuating arm extends from the control arm and is advanced thereby to rotate the pawl or latch member out of a position of engagement with rachet teeth on the spool. A time delay device is reset by the counterclockwise movement of the control arm to provide a time delay to the clockwise movement of the control arm. This movement will occur upon the reverse movement of the cam which releases the control arm as the spool winds up the slack in the belt as it moves into snug engagement with the seat occupant. After a time delay, the pawl or latch member will be returned to ratchet teeth engagable position to prevent the protraction of the seat belt thereafter.

BRIEF DESCRIPTION OF THE DRAWING

FIG. 1 is a side elevational view of an exemplary constructed embodiment of the locking seat belt retractor of the present invention, shown with an associated seat belt in a retracted condition;

FIG. 2 is a cross-sectional view similar to FIG. 1, showing the retractor after protraction of the belt but prior to locking thereof, and FIG. 3 is a cross-sectional view similar to FIG. 1, showing the retractor in a locked condition.

DESCRIPTION OF THE PREFERRED EMBODIMENT

In the drawings, a locking seat belt retractor assembly 10 is illustrated embodying features of the present invention. The retractor assembly is shown in operative association with a conventional fabric seat belt 12 having a tongue 14 secured to one end thereof. The assembly 10 is adapted to be fixedly mounted on, for example, the floor of an automobile. The retractor assembly 10 permits extension of the belt 12 so as to enable the tongue 14 to be detachably secured to an associated belt buckle (not shown). After the tongue 14 is attached to the buckle, any slack in the belt 12 is automatically taken up by the retractor 10 through operation of a spring (not shown) which exerts a constant torque on a belt support spool 16, in a manner well known in the art. Thereafter, the belt 12 is locked against protraction, in a manner to be described.

A shaft 18 on the spool 16 is provided with a pinion gear 20 which is adapted to engage the teeth of a ring gear 22. The ring gear 22 rotates about an axis which extends parallel to the axis of the shaft 18 but which is radially spaced therefrom. The ring gear 22 is mounted for rotation by a gear housing 24 which is supported on one side of a frame member 26 of the retractor 10. The ring gear 22 is provided with a radially outwardly extending cam portion 28 which is rotatably oriented by the spool 16 through the rotation of the pinion gear 20. A latch control arm 30 is supported for rotation by a shaft 32 on said one side of the frame 26 in a manner such that, upon preselected rotation of the ring gear 22 the cam portion 28 thereof will move into engagement with a cam follower section 34 of the control arm 30 so as to advance the control arm counterclockwise, as illustrated in FIG. 1, for a purpose to be described hereinafter.

One end of a spring arm 36 is secured to the control arm 30 by rivets 31, the opposite end being formed into V-shape with the apex 38 thereof bearing against a pawl or latch member 40. It is to be noted that the spring arm 36 extends in a direction generally tangentially of the arc of rotation of the control arm 20 and generally parallel to the plane of the pawl or latch member 40. This orientation is important since it minimizes the work required by the time delay device in moving the control arm clockwise.

As best seen in FIG. 1 of the drawing, the spring arm 36 effects a counterclockwise bias on the pawl or latch member 40 about a fulcrum 42 within the frame 26. The movement of the control arm 30 clockwise moves the apex portion 38 of the spring arm 36 to the left along the surface of the pawl or latch member 40. As the apex 38 moves past the fulcrum 42, the bias of the spring arm 36 rotates the pawl or latch member 40 in a clockwise direction into a position of engagement with a tooth 44 on the support spool 16.

The clockwise movement of the control arm 30 is effected by the bias of a pneumatic time delay device 50 which is of conventional construction. The delay device 50 comprises a cup shaped metallic housing 52 adapted to be secured to a support bracket 54 by a stud 56 fixed to the end thereof. The bracket 54 is secured to the frame 26 of the retractor assembly 10 as by rivets 55.

The time delay device 50 has an elastomeric diaphragm 56 with an air bleed passage 58 provided through the center thereof. The diaphragm 56 is normally biased to the left, as illustrated in FIG. 3, by a coil spring 60. An aperture 61 through the wall of the housing 52 exhausts the air therefrom and permits the diaphragm to be quickly moved into the housing where it will close the aperture. The air bleeds through the bleed passage 58 into the interior of the time delay device 50 between the diaphragm 56 and housing 52 at a controled rate. As the diaphragm 56 moves slowly out of the housing, the aperture 61 is uncovered permitting an inrush of air which will permit a snap action to occur to the operation of the device 50 to move the control arm 30 clockwise. The movement of the diaphragm 56 to the left under the bias of the spring 60 is thereby delayed until a predetermined volume of air is admitted therebehind. Should the bleed passage 58 become plugged or otherwise defective, the minute leakage of air through the aperture 61 and about the diaphragm will permit the spring 60 to move the diaphragm 56 to the left providing a "fail safety" feature.

The diaphragm 56 of the time delay device 50 bears against a conical seat 62 at one end of a plastic cup 63 secured to the lower end 64 of the control arm 30 so as to bias the control arm 30 in a clockwise direction after a predetermined time delay has occurred.

The operation of the seat belt retractor can best be described by following a complete sequence of operation commencing from the fully retracted position as shown in FIG. 1 of the drawing wherein the belt 12 is fully wound on the spool 16. The cam 28 on the gear 22 has been driven to the position shown in FIG. 1 where it engages the cam follower section 34 on the latch control arm 30 so as to move the control arm 30 in the counterclockwise direction. The counterclockwise rotation of the control arm 30 moves the diaphragm 56 of the time delay device 50 to the right into the housing 52 which compresses the spring 60 therein and exhausts the air from the space between the diaphragm 56 and housing 52 through the aperture 61. The counterclockwise movement of the control arm 30 moves the spring arm 36 to the right to a position illustrated in FIG. 1. This moves the apex 38 at the end of the arm 30 across the face of the pawl or latch member 40 which is rotated counterclockwise about the fulcrum 42 within the frame 26. The counterclockwise movement of the pawl or latch member 40 moves the pawl or latch member from the path of interference with the teeth 44 on the spool 16. The portion of the pawl or latch member 40 engaged by the apex 38 is an extension thereof located on the outer side of the frame in alignment with the latching part of the pawl or latch member provided within the frame.

The first increment of protraction of the belt 12 effects rotation of the spur gear 20 on the shaft 18 of the spool 16 thereby to drive the ring gear 22 and the cam portion 28 thereon counterclockwise to move the cam portion 28 out of engagement with the cam follower section 34 of the control arm 30, as shown in FIG. 2. After the movement of the cam portion 28 to the position shown in FIG. 2, the control arm 30 is under the influence of the spring 60 in the time delay device 50 which exerts a clockwise bias on the control arm 30. The movement of the control arm 30 clockwise is delayed as a function of the time required to bleed air through the bleed passage 58 in the diaphragm 56 of the time delay device 50 to the chamber defined by the diaphragm 56 and the housing 52 thereof.

When the air pressure within the time delay device 50 approaches ambient, the spring 60 biases the diaphragm 56 to the left, as shown in FIG. 3, thereby moving the control arm 30 and spring arm 36 thereon to the left to rotate the pawl or latch member 40 in a clockwise direction about the fulcrum 42. In the condition shown in FIG. 3, the pawl or latch member is disposed in the path of movement of the teeth 44 on the spool 16 of the retractor assembly 10 thereby to engage the teeth and preclude protraction of the belt. Since a constant bias is maintained on the spool to effect retraction of the belt as by a spring (not shown) as is well known in the art, the belt will be adjusted so as to fit snuggly about the waist of an occupant of a vehicle yet protraction will be precluded, after a predetermined time delay, by the engagement of teeth 44 on the spool 16 by the pawl or latch member 40.

It is to be noted that, once the control arm 30 and the time delay device 50 have moved to the position illustrated in FIG. 3 of the drawing, complete retraction of the belt 12 upon the spool 16 is required in order to effect further protraction.

One of the features of the instant invention can best be understood by comparing FIGS. 1, 2, and 3 of the drawings, noting that the portion of the latch member 40 engaged by the apex 38 of the spring 36 extends generally tangentially to the arc of movement of arm 30 and spring 36 about the pivot 32. However, the bias of the spring 36 is generally radial to the arc of rotation of the arm 30 and spring 36. This geometric relationship is important since it permits the spring 36 to be relatively strong thereby to positively move the latch member 40 into and out of engagement with the teeth 44 on the spool 16, but the spring 60 of the time delay device 50 does not have to exert a force sufficient to overcome the bias of the spring 36. Stated in another manner, the bias of the time delay spring 60 is essentially at a right angle to the bias of the spring 36 thus, a conventional and relatively light time delay device 50 is utilized to control a relatively strong spring 36 thereby to maximize manufacturing economy of the subject retractor as well as operating safety. Moreover, the fact that the time delay 50 operates with a longer lever arm relative to the pivot 32 of the control arm 30 than the apex 38 of the spring 36 results in a mechanical advantage to further minimize loading of the time delay 50 thereby to maximize the fail safe characteristic thereof.

Another feature of the instant invention which should be apparent from the foregoing description is that a single spring is utilized to bias the latch member 40 into and out of engagement with the teeth 44 of the spool 16. In seat belt retractors heretofore known and used multiple springs and/or mechanical linkages have been utilized to effect said movement.

I claim:

1. A locking seat belt retractor, a frame, a ratcheted spool mounted for rotation on said frame, a flexible belt adapted to be wound on said spool, a spring constantly urging the spool in a direction to effect retraction of the belt thereon, and a pawl pivoted on said frame and engageable with the ratchet of said spool to stop rotation of said spool in the direction of belt protraction, the improvement including a member pivoted to the frame and extending downwardly adjacent to the pawl, a spring finger fixed to said pivoted member and spring urged against said pawl, and means pivotally moving said member to move the end of the finger across said pawl from one to the other side thereof so as to rock the pawl to ratchet engaged and disengaged positions.

2. A locking seat belt retractor in accordance with claim 1, wherein means are effective when the belt is released and wound on the spool for moving said pivoted member to have the finger rotate the pawl out of a position of engagement with the ratchet of said spool.

3. A locking seat belt retractor in accordance with claim 2, wherein said pawl is pivoted for movement into and out of engagement with the ratchet of said spool, said pawl having a flat portion extending on opposite sides of the pivot point thereof and oriented generally tangentially to the arc of rotation movement of said resilient means.

4. A locking seat belt retractor in accordance with claim 2, wherein a time delay device is provided in the path of movement of the pivoted member for returning said pivoted member to its initial position after a time delay which movement moves the finger across the pawl to move it into ratchet engaging position.

5. A locking seat belt retractor in accordance with claim 4, including a cam advanced by the rotation of said spool into engagement with said pivoted member to effect movement of said resilient means to move the pawl to released position with respect to the ratchet of said spool and to reset the time delay.

* * * * *